P. W. HOLSTEIN & G. C. HORST.
CAR HAUL.
APPLICATION FILED FEB. 2, 1910.
971,614.
Patented Oct. 4, 1910.
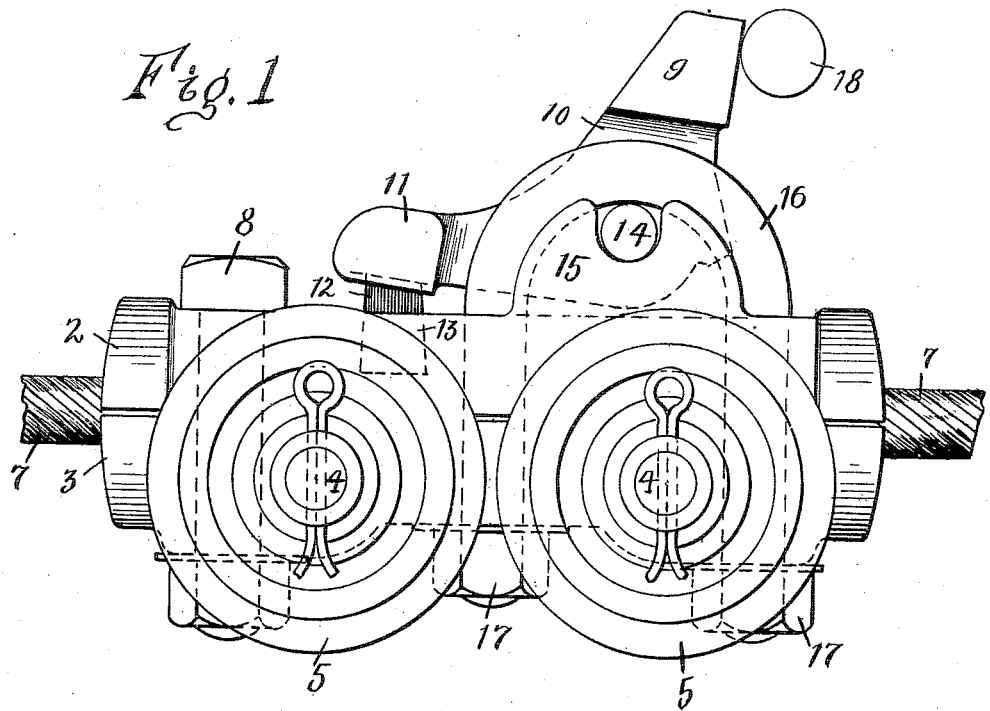
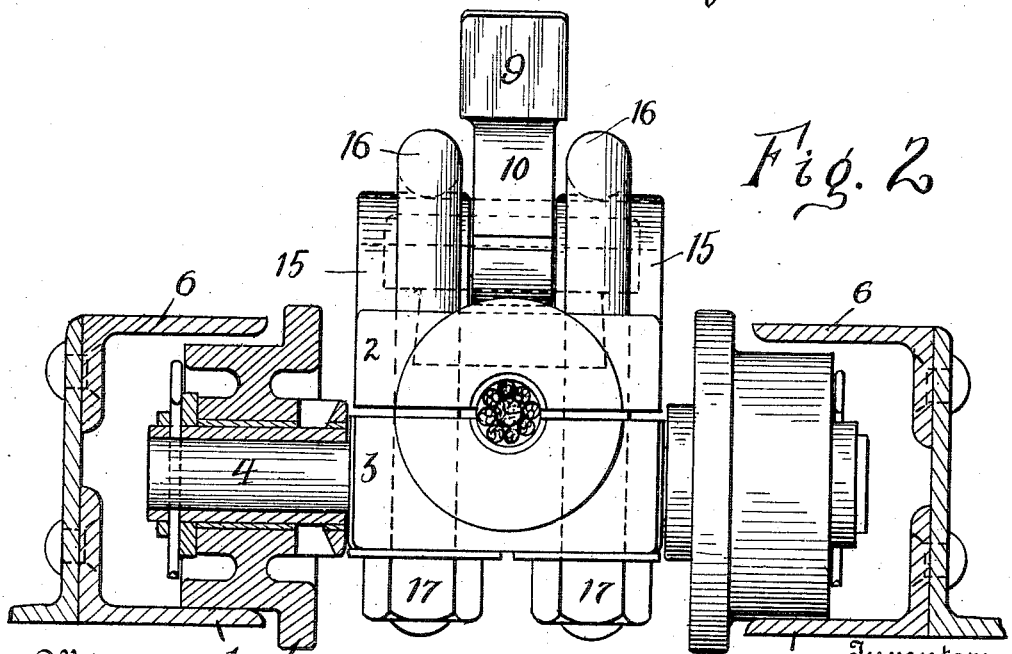
Witnesses
George E. Edelin
George R. Bliss
Inventors
Geo. C. Horst
Paul W. Holstein
By H. H. Bliss
Attorney

UNITED STATES PATENT OFFICE.

PAUL W. HOLSTEIN AND GEORGE C. HORST, OF COLUMBUS, OHIO, ASSIGNORS TO THE JEFFREY MANUFACTURING COMPANY, A CORPORATION OF OHIO.

CAR-HAUL.

971,614.        Specification of Letters Patent.     Patented Oct. 4, 1910.

Application filed February 2, 1910. Serial No. 541,527.

*To all whom it may concern:*

Be it known that we, PAUL W. HOLSTEIN and GEORGE C. HORST, both citizens of the United States, residing at Columbus, in the county of Franklin and State of Ohio, have invented certain new and useful Improvements in Car-Hauls, of which the following is a specification, reference being had therein to the accompanying drawing.

In the accompanying drawings:—Figure 1 is a side view of so much of a conveyer embodying the invention as is necessary for the understanding of the latter. Fig. 2 is an end view, partly in section, of the same showing also in section the supporting and guiding track.

Referring to the drawings, 1 is a track by which the driving devices are supported and guided. The driving devices preferably comprise a carriage 2, 3, having fixed journals 4 on which are mounted wheels 5 running on or in the track 1. The track may be provided with means for limiting or confining the tilting of the carriage, such as flanges 6 which overlie the wheels 5. Such flanges may also serve as a track for the driven parts of the conveyer.

The carriage is constructed for attachment to the actuating cable or chain of the conveyer in any suitable manner. As illustrated it is made in the upper and lower parts 2, 3 which are clamped upon the cable 7 by bolts 8 which pass vertically through the said parts.

The immediate driving element or pusher attachment of the conveyer is shown at 9. It comprises a spur extending from the carriage in such manner as to engage the driven element, and is formed with or attached to an angle lever having an arm 10 carrying the spur and an arm 11 which is preferably arranged near the carriage.

Between the carriage and the arm 11 is situated the cushioning element for the driving element 9, which cushioning element acts to absorb the impact and pressure incident to overcoming the inertia of the driven element and load of the conveyer. This relieves the conveyer as a whole of a great part of the shock and enables the conveyer to be made of lighter and cheaper construction and still have ample strength for its work. In the particular construction illustrated the cushioning element consists of an elastic block 12 of suitable material, such as hard rubber or fibrous substance held in a dovetailed cavity 13 formed in the carriage, and adapted to be encountered by the lever arm 11 of the driving element as said arm is forced toward the carriage by the contact of the driving and driven elements and the backward movement of the lever arm 10. The said force of impact and inertia with and of the driven element is thus transferred directly to the carriage and track at substantially right angles to the same.

The pivot for the lever 10, 11 is furnished by lateral trunnions 14 cast on the sides of the same and fitting in bearings 15 formed in the carriage. We prefer to make these bearings open for economy and the ready assemblage of the parts, the trunnions being confined therein by U-bolts 16 which pass over the trunnions, rest on the tops of the bearings 15 and pass through the parts of the carriage, thus assisting in holding such parts together. The bolts 16 are clamped in place by nuts 17.

The driven element is indicated at 18 and may be the axle or other part of the car (not shown) or other load-carrying means.

What we claim is:

1. The combination, in a conveyer, of the driven element, the driving element, and a cushioning element acted upon by the driven and driving elements and serving to assist in absorbing the shock of impact between the driving and driven elements and thereby enable the conveyer to be made of a relatively lighter and more economical construction, substantially as set forth.

2. The combination, in a conveyer, of a driven element, a lever constituting a driving element, means for actuating the driving element, and a cushioning device interposed between the lever and the actuating means, substantially as set forth.

3. In a conveyer, the combination of a driving means comprising a lever and means for cushioning the lever whereby the shock of impact is partly absorbed and the conveyer enabled to be made of a relatively lighter and more economical construction, substantially as set forth.

4. In a conveyer, the combination of a driven element, and a driving element comprising a pivoted lever one arm of which is adapted to be forced backward by impact with the driven element and the other arm of which is arranged to be forced downward by the said impact, and a cushioning device for the latter arm of the lever, substantially as set forth.

5. In a conveyer, the combination of a driven element, a cable, a cable clamp, a lever mounted on the cable clamp and having an arm arranged to engage the driven element and another arm movable toward a portion of the cable clamp, and a cushioning device on which the latter arm of the lever acts, substantially as set forth.

6. In a conveyer, the combination of a driven element, a longitudinally acting power means, a device for engaging the latter to be actuated and carried thereby, and cushioning devices arranged to encounter the driven element and acting at one angle against the said engaging device when they are acted upon at another angle by the driven element, substantially as set forth.

7. In a conveyer, the combination of a driven element, a spur for engaging the same, a carriage on which the spur is movably mounted, a track for the carriage, and a cushioning element acting to receive the impact of the spur with the driven element and transmitting such impact against the said track, substantially as set forth.

8. In a conveyer, the combination of a driven element, a spur for engaging the same, a carriage on which the spur is movably mounted, wheels supporting the carriage, a track for the wheels having means for confining the tilting of the carriage, and a cushioning element between the spur and the carriage, substantially as set forth.

9. In a conveyer, the combination of a driven element, a spur for engaging the same, a carriage on which the spur is movably mounted, a track for the carriage, a cushioning element receiving at substantially right angles to the track the impact of the spur with the driven element, and means for actuating the carriage, substantially as set forth.

10. In a conveyer, the combination of a driven element, a spur for engaging the same, a carriage on which the spur is movably mounted, a track for the carriage having means for confining the tilting of the carriage, a cushioning element receiving at substantially right angles to the track the impact of the spur with the driven element, and means for actuating the carriage, substantially as set forth.

11. In a conveyer, the combination of a driven element, a movable spur for engaging the same having lateral trunnions, a carriage having bearings for the said trunnions, bolts passing over the trunnions and engaging the carriage, and means for actuating the carriage, substantially as set forth.

In testimony whereof we affix our signatures, in presence of two witnesses.

P. W. HOLSTEIN.
GEORGE C. HORST.

Witnesses:
PERCY C. DIERDORFF,
JESSE F. RANNEY.